US012735018B2

(12) United States Patent
Chelaidite et al.

(10) Patent No.: US 12,735,018 B2
(45) Date of Patent: Sep. 15, 2026

(54) ELECTROMECHANICAL BRAKE HAVING A FORCE SENSOR

(71) Applicants: ZF Active Safety US Inc., Livonia, MI (US); ZF ACTIVE SAFETY GMBH, Koblenz (DE)

(72) Inventors: Galus Chelaidite, South Lyon, MI (US); Karlheinz Schaust, Fachbach (DE); Thomas Klug, Koblenz (DE)

(73) Assignees: ZF ACTIVE SAFETY US INC., Livonia, MI (US); ZF ACTIVE SAFETY GMBH, Koblenz (DE)

( * ) Notice: Subject to any disclaimer, the term of this patent is extended or adjusted under 35 U.S.C. 154(b) by 483 days.

(21) Appl. No.: 18/348,027

(22) Filed: Jul. 6, 2023

(65) Prior Publication Data

US 2025/0010835 A1 Jan. 9, 2025

(51) Int. Cl.

| | |
|---|---|
| ***B60T 13/74*** | (2006.01) |
| ***B60T 8/17*** | (2006.01) |
| ***B60T 17/22*** | (2006.01) |
| ***F16D 65/18*** | (2006.01) |
| ***F16D 66/00*** | (2006.01) |
| *F16D 121/24* | (2012.01) |
| *F16D 125/40* | (2012.01) |
| *F16D 125/46* | (2012.01) |

(52) U.S. Cl.

CPC .............. *B60T 13/746* (2013.01); *B60T 8/17* (2013.01); *B60T 17/22* (2013.01); *F16D 65/18* (2013.01); *F16D 66/00* (2013.01); *F16D 2066/005* (2013.01); *F16D 2121/24* (2013.01); *F16D 2125/40* (2013.01); *F16D 2125/46* (2013.01)

(58) Field of Classification Search

CPC .......... B60T 13/746; B60T 8/17; B60T 17/22; F16D 66/00; F16D 2066/005; F16D 2121/24; F16D 2125/40; F16D 2125/46

USPC ................................ 188/72.6–72.9, 156–164

See application file for complete search history.

(56) References Cited

U.S. PATENT DOCUMENTS

| | | | | |
|---|---|---|---|---|
| 7,273,134 | B2 * | 9/2007 | Schack | F16D 65/183 188/1.11 R |
| 7,431,133 | B2 * | 10/2008 | Maron | B60T 7/107 188/162 |
| 2014/0022717 | A1 * | 1/2014 | Bolik | G01L 19/148 361/679.01 |
| 2016/0091039 | A1 * | 3/2016 | Masuda | F16D 55/225 188/72.1 |
| 2024/0326769 | A1 * | 10/2024 | Chelaidite | B60T 13/746 |

FOREIGN PATENT DOCUMENTS

| | | | |
|---|---|---|---|
| EP | 1430235 B1 * | 8/2008 | F16D 65/18 |

* cited by examiner

*Primary Examiner* — Christopher P Schwartz
(74) *Attorney, Agent, or Firm* — Tarolli, Sundheim, Covell & Tummino LLP

(57) ABSTRACT

An assembly for an electromechanical brake of a vehicle having a caliper assembly driven by a motor includes a cup gear or a drive disk for receiving torque from the motor and transferring the torque to a spindle. A piston is coupled to the spindle or a ball ramp and moves axially relative to the spindle in response to rotation of the spindle to brake the vehicle during a braking operation. A force sensor is aligned with the spindle and cup gear for sensing a reaction force applied to the piston during the braking operation. A thrust bearing is provided for transferring the reaction force from the cup gear to the force sensor.

21 Claims, 7 Drawing Sheets

Control System
44
150
152
154
156
158
116
144
180
142
160
90
136
140
112
110
72
$R_1$
$R_2$
$R_3$
$R_4$

ELECTROMECHANICAL BRAKE HAVING A FORCE SENSOR

TECHNICAL FIELD

The present invention relates to braking systems and, in particular, relates to an electromechanical brake having a force sensor integrated therein.

BACKGROUND

Current vehicles are equipped with electric motor service brakes for helping control vehicle braking depending on predetermined scenarios. The service brakes rely on one or more movable pistons that selectively apply force to brake pads in order to slow down or stop rotating wheel rotors on the vehicle. The electric motor direction of rotation can be reversed to release or reduce braking in emergency scenarios or drive-away conditions from a standstill on a hill.

SUMMARY

In one example, an assembly for an electromechanical brake of a vehicle having a caliper assembly driven by a motor includes a cup gear for receiving torque from the motor and transferring the torque to a spindle. A piston is coupled to the spindle and moves axially relative to the spindle in response to rotation of the spindle to brake the vehicle during a braking operation. A force sensor is aligned with the spindle and cup gear for sensing a reaction force applied to the piston during the braking operation. A thrust bearing is provided for transferring the reaction force from the cup gear to the force sensor.

In another example, an assembly for an electromechanical brake of a vehicle having a caliper assembly driven by a motor includes a spindle and a piston coupled to the spindle and moving axially relative to the spindle in response to rotation of the spindle to brake the vehicle during a braking operation. A cup gear is provided for receiving torque from the motor and transferring the torque to the spindle. A housing receives the cup gear and at least a portion of the spindle and the piston. A button force sensor is aligned with the spindle and cup gear for sensing a reaction force applied to the piston during the braking operation. A thrust bearing is provided for transferring the reaction force from the cup gear to the force sensor. A load flange received by the cup gear is positioned axially between the spindle and the force sensor for transferring reaction force from the cup gear to the force sensor. A controller is connected to the button force sensor and configured to adjust the torque applied to the spindle in response to receiving signals from the force sensor indicative of the reaction force.

In another example, a method of controlling a caliper assembly of a vehicle includes applying current to a motor for actuating the caliper assembly to initiate a braking operation. Rotation of the motor is monitored during the braking actuation. A reaction force through the caliper assembly is sensed during the braking operation. The current applied to the motor is adjusted until the sensed reaction force reaches a predetermined amount.

Other objects and advantages and a fuller understanding of the invention will be had from the following detailed description and the accompanying drawings.

DETAILED DESCRIPTION

Figure 1:
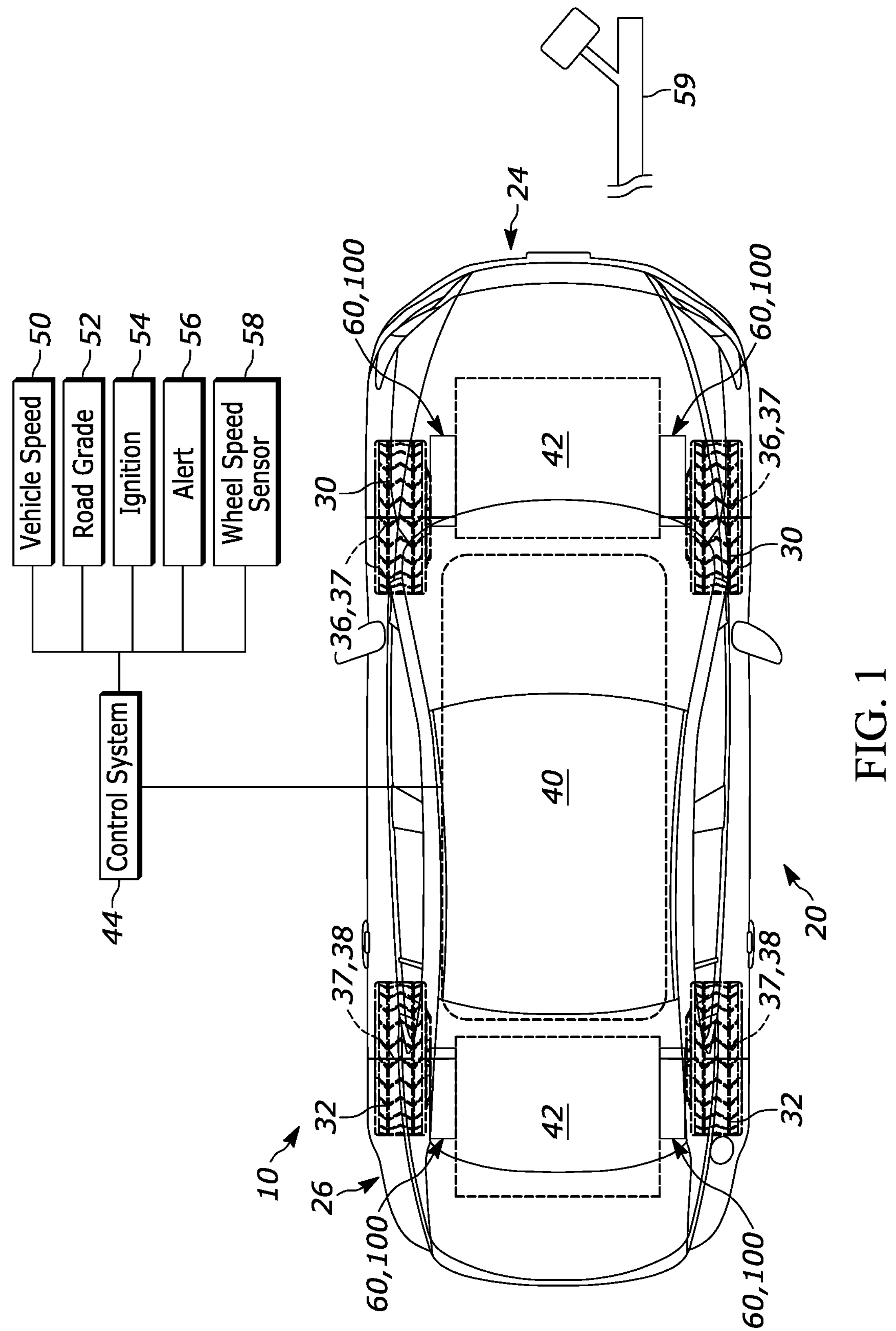
FIG. 1 is a schematic illustration of a vehicle having a braking system.

The present invention relates to braking systems and, in particular, relates to an electromechanical brake or EMB having a force sensor integrated therein. FIG. 1 illustrates an example electric brake/braking system 10 for a motor vehicle 20 in accordance with the present invention. The vehicle 20 can be an electric, hybrid or internal combustion engine powered vehicle.

The vehicle 20 extends from a first or front end 24 to a second or rear end 26. A pair of steerable wheels 30 is provided at the front end 24. Each wheel 30 includes a wheel rotor 36 driven and steered by a steering linkage (not shown). A pair of steerable or non-steerable wheels 32 is provided at the rear end 26. Each wheel 32 includes a wheel rotor 38 driven by a steering linkage (not shown). Friction brake pads 37 are associated with each wheel rotor 36, 38 and positioned on opposite sides thereof.

In the case of an electric vehicle, a battery 40 supplies power to the vehicle 20 and cooperates with front and/or rear powertrains 42 to supply torque to the wheels 30. In other words, the battery 40 forms part of the vehicle propulsion system.

A caliper or caliper assembly 60 is provided on at least one of the wheel rotors 36, 38 and controls both service braking and the parking brake associated with that wheel rotor. As shown, each wheel rotor 36, 38 on the front and rear ends 24, 26 includes a caliper assembly 60. The caliper assembly 60 is an electromechanical brake and therefore does not rely on or require hydraulic fluid to operate. It will be appreciated that in the interest of brevity certain conventional features of the caliper assembly 60, e.g., drive motor, are not illustrated in FIG. 2.

Figure 2:
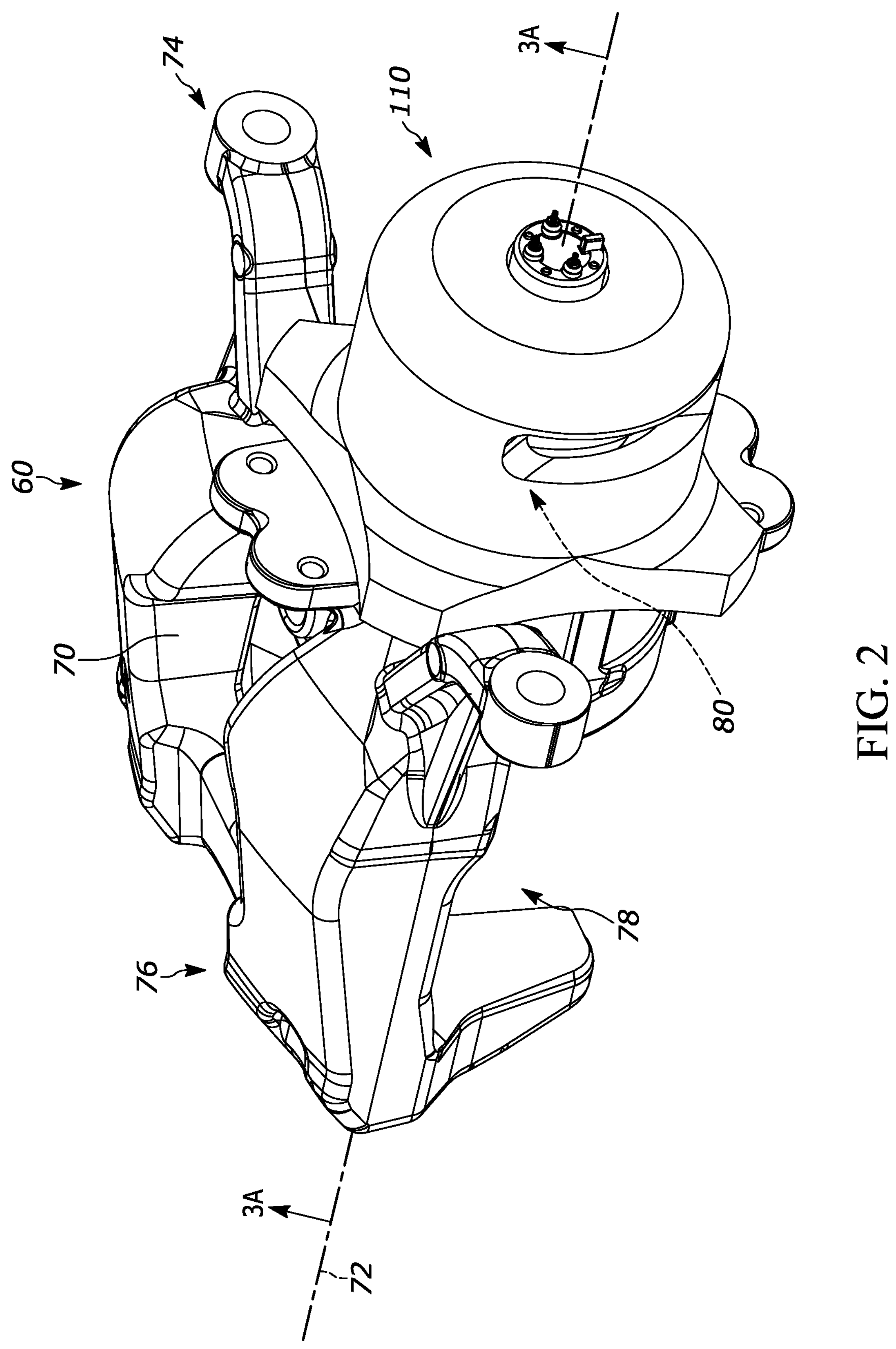
FIG. 2 is a perspective view of a portion of an example caliper assembly for the braking system of FIG. 1.
Figure 3A:
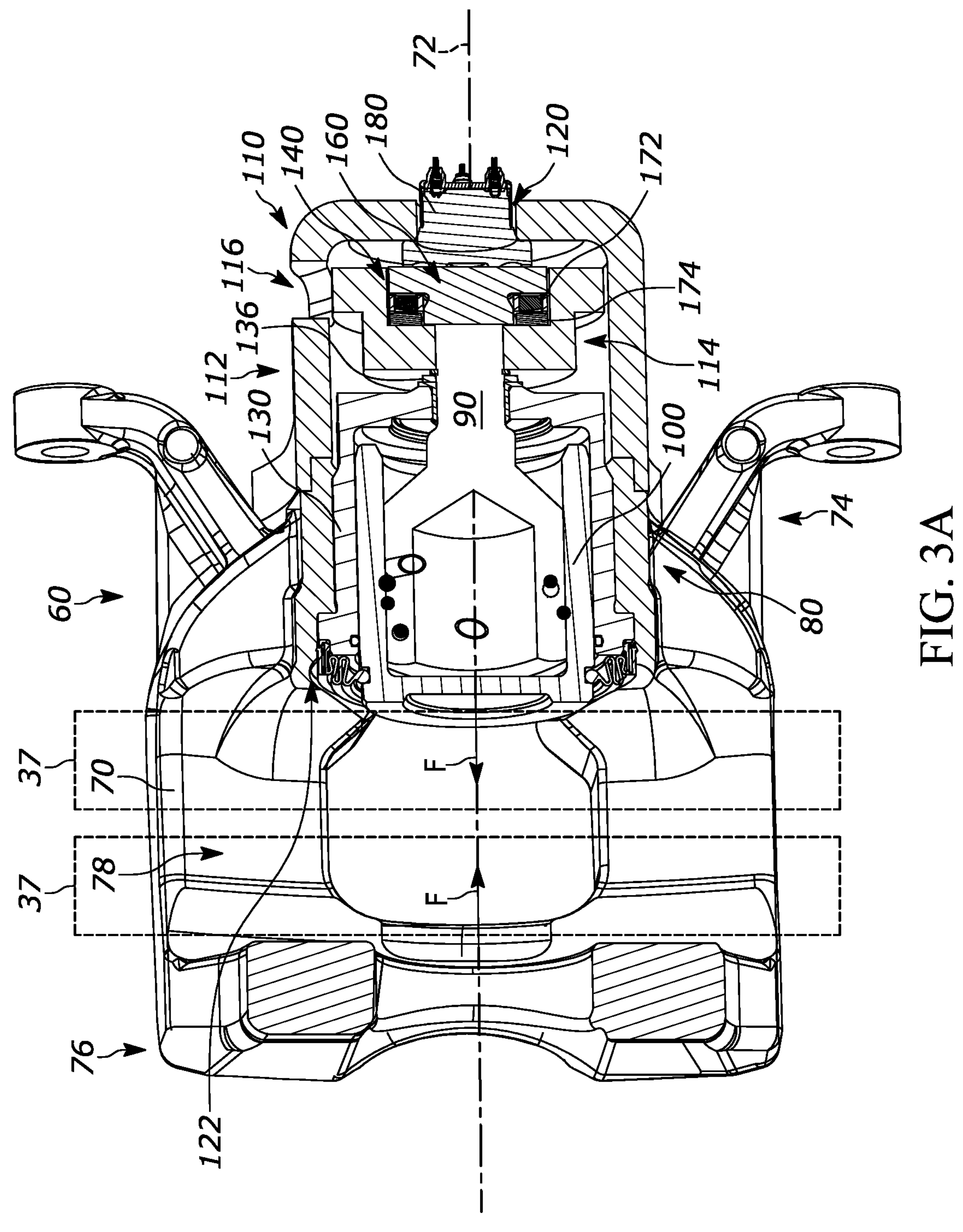
FIG. 3A is a section view of the caliper assembly taken along line 3A-3A in FIG. 2.

Referring to FIGS. 2 and 3A, the caliper assembly 60 includes a housing 70 extending along a centerline 72 from a first end 74 to a second end 76. A first passage 78 extends through the housing 70 perpendicular to the centerline 72 and receives the brake pads 37 (shown in phantom) in a known manner. A second passage 80 extends through the first end 74 of the housing 70 generally along the centerline 72 to the first passage 78.

The caliper assembly 60 further includes a spindle 90 and a ball nut 100 operably coupled thereto for selectively applying braking force F to the rotor 36 or 38 via the brake pads 37 in a known and controllable manner. The caliper assembly 60 can be configured as a ball nut assembly (recirculating or non-recirculating), a roller screw, a ball ramp assembly or any high efficiency mechanical assembly capable of converting rotary motion of the spindle to linear motion of the piston(s). Examples of ball nut and ball ramp assemblies can be found in U.S. Pat. No. 9,976,614 and U.S. Patent Publication No. 2019/0331180, the entirety of which are incorporated herein by reference.

In this example, the ball nut 100 is coupled to the spindle 90 such that rotation of the spindle results in axial movement of the ball nut. In this manner, the ball nut 100 acts as a piston for applying the braking force F during braking operations.

Returning to FIG. 1, a control system 44 is provided to help control operation of the vehicle 20, such as operation of the propulsion system and vehicle braking, including operation of the caliper assemblies 60. To this end, the control system 44 can include one or more controllers, such as a propulsion system controller, motor controller, and/or brake controller. That said, the control system 44 is connected to and receives signals from various sensors that monitor vehicle functions and environmental conditions.

For example, a vehicle speed/acceleration sensor 50 monitors the vehicle speed and acceleration and generates signals indicative thereof. A road grade sensor 52 can detect or calculate the slope of the road on which the vehicle 20 is driving and generate signals indicative thereof. An ignition sensor 54 generates signals indicative of ignition status. A wheel speed sensor 58 is provided on/adjacent to each wheel 32 and generates signals indicative of the speed at each wheel. The control system 44 also receives signals indicative of the degree-including velocity and acceleration-a brake pedal 59 is depressed.

The control system 44 can receive and interpret these signals and perform vehicle functions, e.g., braking, in response thereto. In one example, the control system 44 can detect wheel slip between one or more wheels 30, 32 and the driving surface based on the sensors 50, 58 and perform anti-lock braking (ABS) and/or electronic stability control (ESC) using one or more caliper assemblies 60. The control system 44 can also be connected to an alert 56 for notifying the driver/operator of the vehicle 20 of vehicle conditions, vehicle status, braking operations, and/or environmental conditions.

Figure 3B:
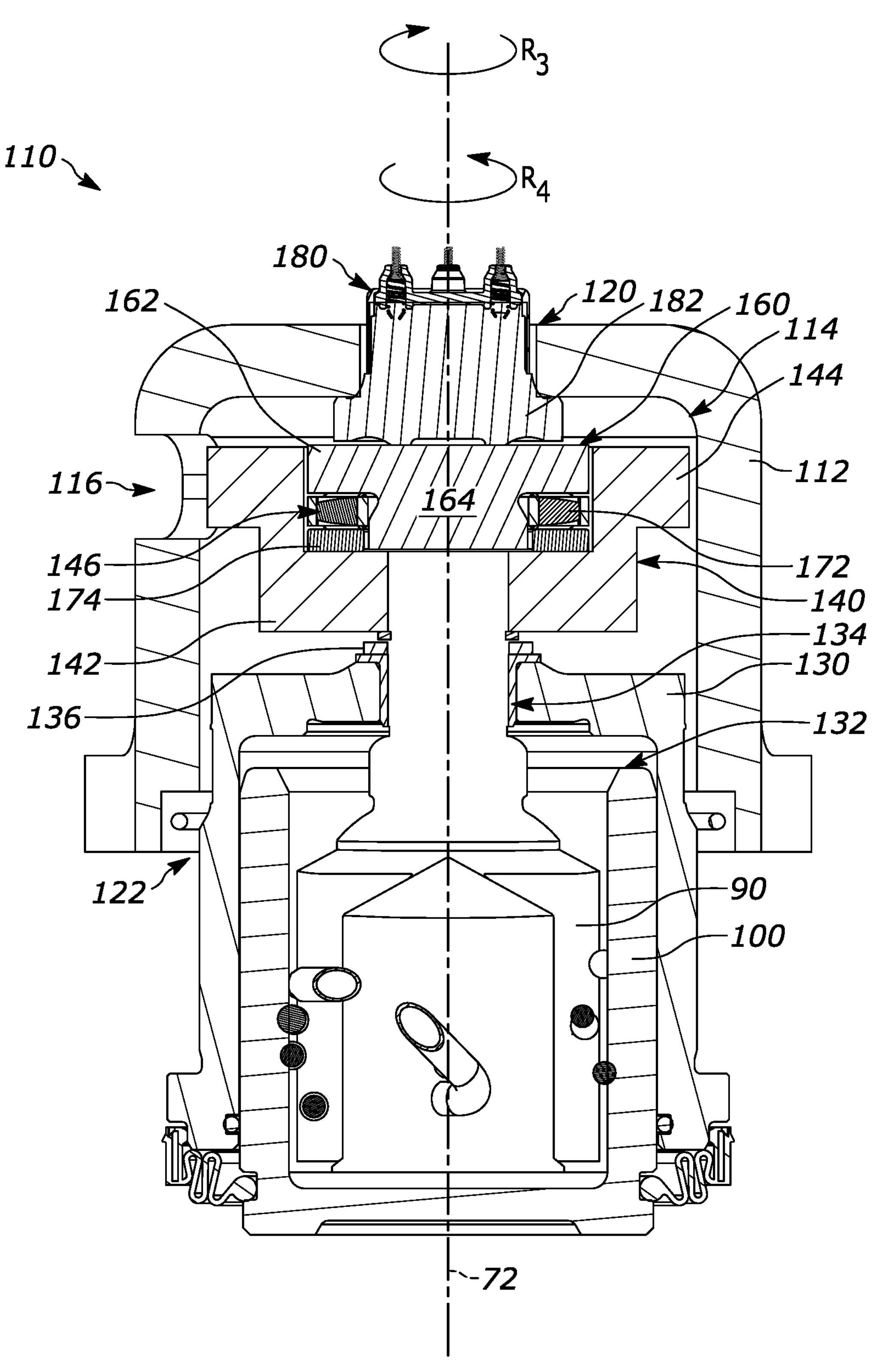
FIG. 3B is an enlarged view of a force sensor of the caliper assembly of FIG. 3A.

Referring to FIGS. 3A-3B, a force sensing device or assembly 110 extends into the second passage 80 of the housing 70 and is connected to the spindle 90 and the ball nut 100 for sensing reaction forces applied to the spindle and ball nut during braking operations. The force sensing device 110 includes a housing 112 defining an interior space 114. The housing 112 extends into the second passage 80 of the housing 70 and is fixed to the housing so as to extend along or parallel to the centerline 72. A lateral opening 116 extends through the housing 112 and transverse, e.g., perpendicular, to the centerline 72 into the passage 114.

Openings 120, 122 are provided at opposite longitudinal ends of the housing 112 on either side of the interior space 114. The openings 120, 122 are aligned with one another along the centerline 72. The spindle 90 and ball nut 100 extend through the opening 122 and into the interior space 112. A sleeve 130 is also positioned within the interior space 112 and extends through the opening 122 out of the housing 112. The sleeve 130 includes an interior space 132 for receiving the ball nut 100 and the spindle 90. The spindle 90 extends through an opening 134 in the sleeve 130 towards the opening 120 in the housing 112. A bushing or bearing 136 is provided on or integrally formed with sleeve 130 aligned with the opening 134 for receiving the end of the spindle 90.

A cup gear 140 is provided axially between the sleeve 130 and the housing 112 within the interior space 114. The cup gear 140 includes a first portion 142 having an anti-twist or anti-rotation connection with the spindle 90, e.g., splined, feather-keyed, interference fit, adhesive, fastener, pinned, welded, integrally formed, etc., for transferring torque therebetween. The cup gear 140 includes a second portion 144 aligned with the lateral opening 116 in the housing 112 and is configured to receive torque from structure outside the housing 112.

Figure 4:
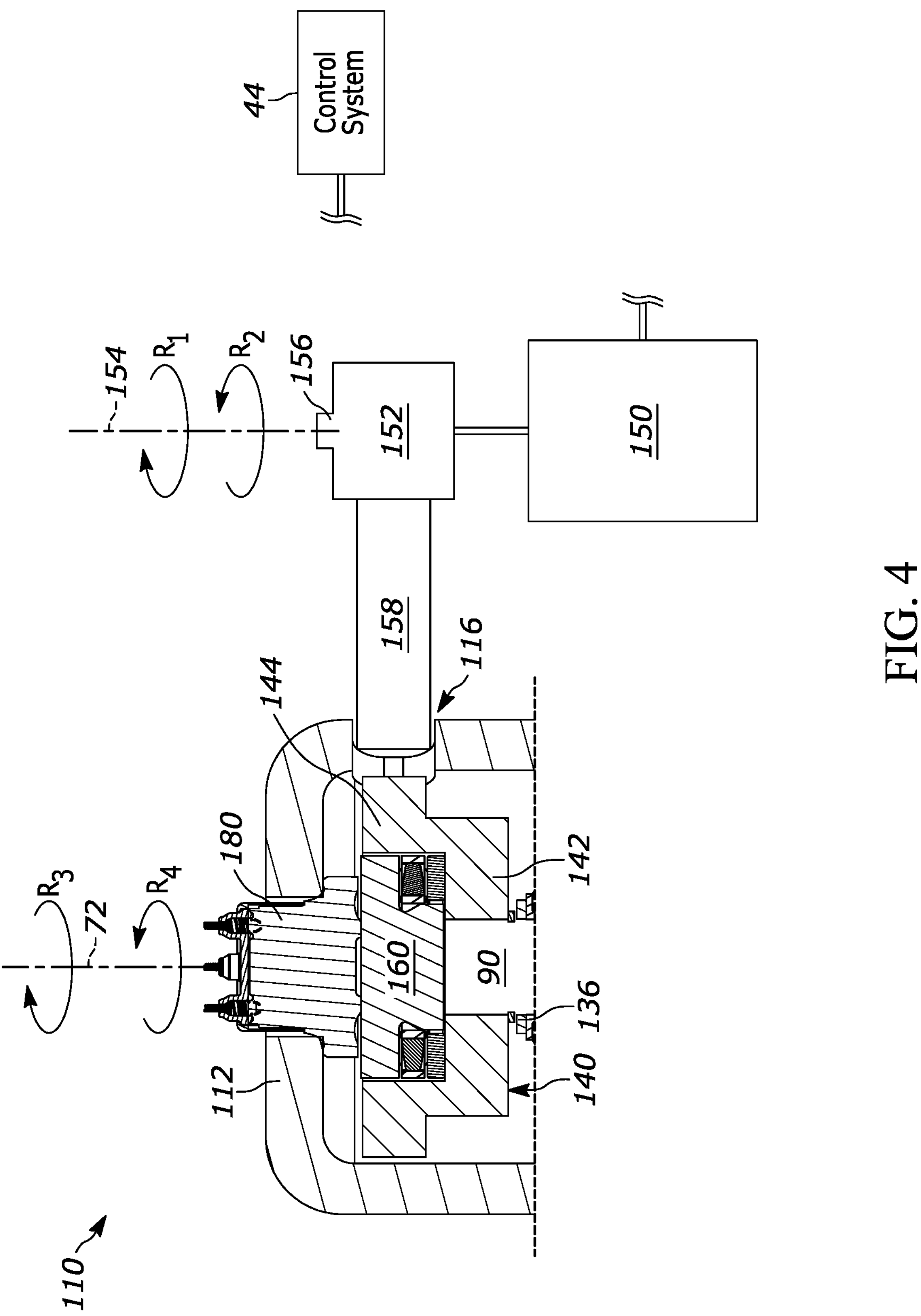
FIG. 4 a schematic illustration of a motor coupled to a portion of the caliper assembly.

To this end, in one example shown schematically in FIG. 4, a motor 150 is provided for delivering torque to the cup gear 140. To this end, the motor 150 includes output pinion or motor gear 152. The motor 150 is actuated to rotate the motor gear 152 about an axis 154 in the manners $R_1$ or $R_2$ (counterclockwise or clockwise, respectively, as shown). A sensor 156, e.g., a magnetic or inductive position sensor, tracks the rotational position of the motor gear 152 relative to its axis 154.

A gear or gear train 158 is meshed with the motor gear 152 and the cup gear 140 for transferring torque therebetween. It will be appreciated that the gear train 158 can constitute one or more gears in any arrangement, e.g., serial connection, planetary, etc. Alternatively, the gear train 158 can be omitted and replaced with a belt drive or the like so long as torque can be transferred between the motor gear 152 and the cup gear 140. Moreover, it will be appreciated that the cup gear 140 can be omitted and replaced with a drive gear and drive disk (not shown).

Returning to FIG. 3B, the cup gear 140 also includes a recess or pocket 146 for receiving a load flange 160. The load flange 160 can have a generally T-shaped cross-sectional configuration and includes a base 162 and a projection 164 extending from the base and aligned with—but spaced from—the terminal end of the spindle 90. In other words, there is an axial space or gap between the end of the spindle 90 and the projection 164. A thrust bearing 172 and washer 174 are provided in the pocket 146 between the load flange 160 and the first portion 142 of the cup gear 140. Consequently, the load flange 160, cup gear 140, thrust bearing 172, and washer 174 are concentric/aligned with one another along the centerline 72.

Figure 5:
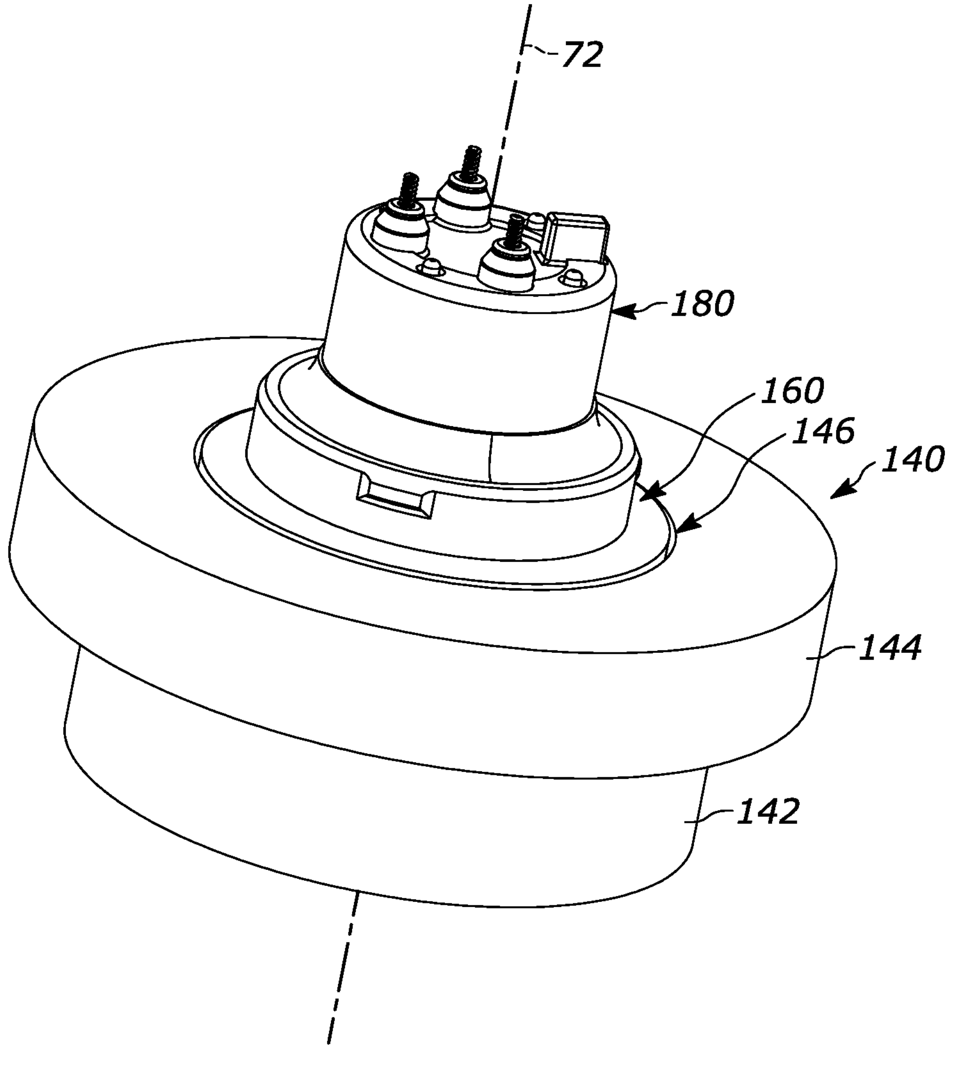
FIG. 5 is a front view of a force sensor of the force sensor.

A force sensor 180 (FIG. 5) extends through the opening 120 of the housing 112 into the interior space 114 and along the centerline 72. In one example, the force sensor 180 is a button force sensor, although other configurations are contemplated. Regardless, the force sensor 180 is connected to the control system 44 and is configured to send signals thereto indicative of forces experienced by the force sensor, such as compressive forces. To this end, the force sensor 180 can include contact springs or contact pads 182 for connecting the force sensor to the control system 44.

The force sensor 180 includes a radially extending flange 182 (see FIG. 3B) pinned between the interior surface of the housing 112 and the load flange 160. This, in turn, pins the base 162 of the load flange 160 between the flange 182 of the force sensor 180 and the thrust bearing 172. Consequently, the load flange 160 is prevented from rotating relative to the cup gear 140. The base 162 of the load flange 160 can include guiding features (not shown) for helping to ensure the force sensor 180 is positioned appropriately on the load flange, e.g., centered thereon.

With this in mind, and returning to FIG. 4, torque received by the cup gear 140 is transferred to the spindle 90, which rotates about the centerline 72 to produce axial movement of the ball nut 100. More specifically, supplying torque to the gear train 160 to rotate the spindle 90 in the manner $R_3$ results in advancing the ball nut 100 towards the rotor 36 or 38 to brake the vehicle 20. On the other hand, supplying torque to the gear train 158 to rotate the spindle 90 in the manner $R_4$ results in the ball nut 100 retreating away the rotor 36 or 38 to reduce or release braking of the vehicle 20.

During operation of the vehicle 20, a service brake apply demand is initiated by the system and/or vehicle operator. In this example, service braking is provided for a single, rear end 26 wheel rotor 38 (see FIG. 1). The brake demand is based on signals received by the control system 44 due to brake pedal 59 depression by a driver or due to automatic vehicle safety systems, e.g., collision avoidance systems.

With this in mind, the control system 44 activates the motor 150 to supply torque to the gear train 158 to thereby rotate in a brake apply direction $R_3$ to supply torque to the spindle 70 along the aforementioned flow path. This, in turn, causes the ball nut 100 to apply a braking force F to the brake pad 37, thereby braking the rotor 38. Rotation of the motor 150 continues until the vehicle 20 responds in accordance with the commanded brake event, at which point the motor has a particular current draw. That said, the control system 44 controls the caliper assembly 60 according to its model-based design, which establishes the correlation between a particular current draw of the motor 150 and a resulting braking force F applied to the rotor 38.

It will be appreciated that rotation speed and torque of the motor 150 can be precisely controlled by the control system 44 using, for example, pulse with modulation (PWM) control. For example, the degree and/or rate of braking force F on the pad 37 during braking can be finely tuned as well as the degree and/or rate of braking force reduction during an ABS event. The control system 44 can rely on signals from any of the sensors indicating, for example, road surface conditions, in controlling PWM.

Figure 6:
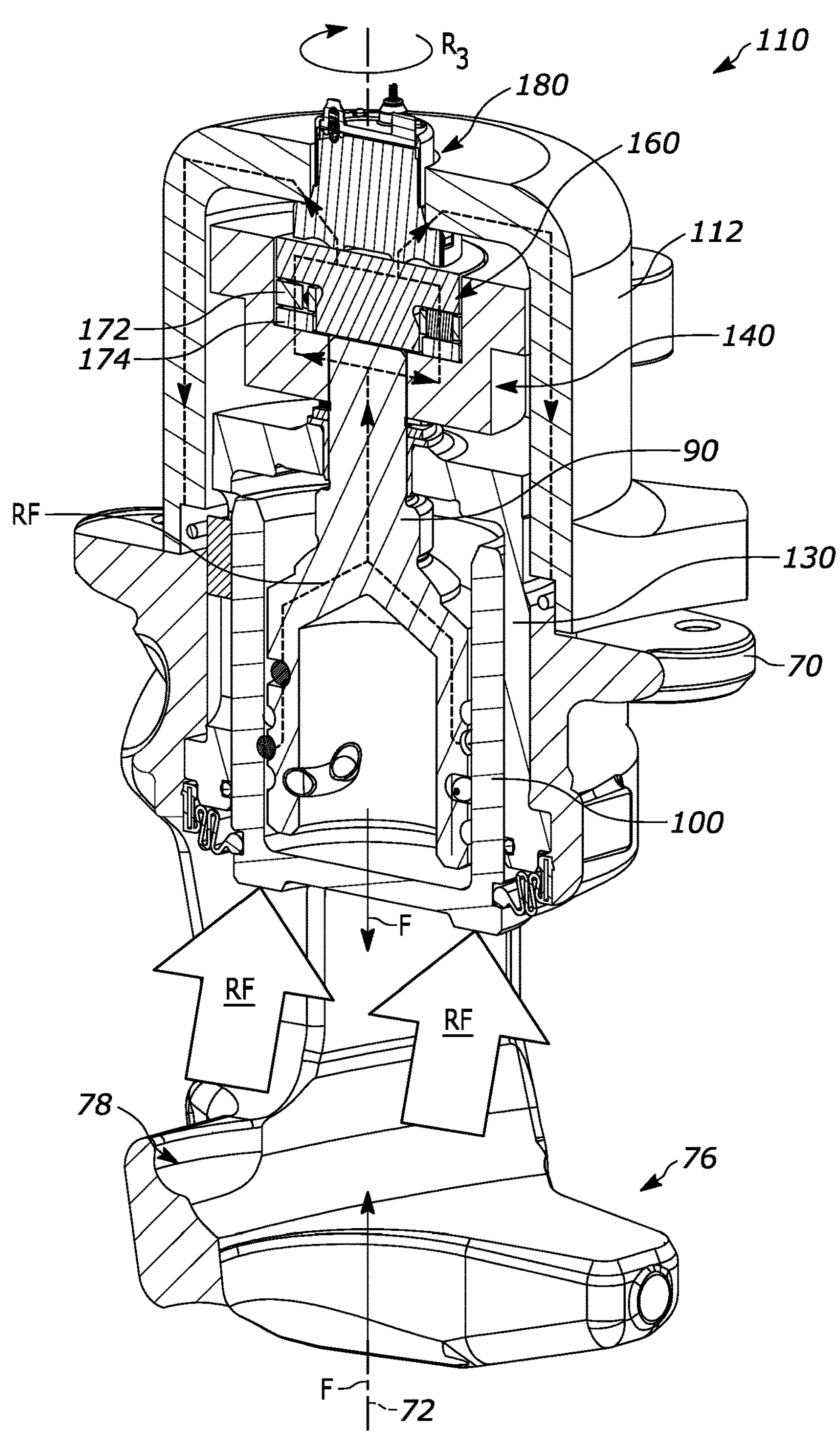
FIG. 6 is a schematic illustration of the force sensor during a braking operation.

In any case, turning to FIG. 6, as the motor 150 rotates in the brake apply direction $R_1$ the cup gear 140 rotates to transfer torque from the gear train 158 and the spindle 90. The load flange 160, however, does not rotate during this torque transfer due to the compressive forces between the force sensor 180, load flange, and thrust bearing 172. At the same time, the bushing/bearing 136 on the sleeve 130 helps to reduce side load forces acting on the thrust bearing 172 and the force sensor 180.

When the braking force F is applied to the pad 37, reaction forces RF are generated back through the system. In particular, the reaction force RF flows through the ball nut 100, the spindle 90, the first portion 142 of the cup gear 140, the washer 174, the thrust bearing 172, the base 162 of the load flange 160, through the force sensor 180, and into the housing 112, where it is ultimately transferred to the caliper housing 70. These reaction forces RF are measured by the force sensor 180—more specifically compressive forces acting on the flange 182—and signals indicative of the reaction forces sent to the control system 44.

The reaction force RF is directly related to, e.g., directly proportional to, the braking force F applied by the ball nut 100 to the rotor 38. Consequently, the control system 44 can correlate the sensed reaction force RF to the applied braking force F. At the same time, the control system 44 relies on the magnetic position sensor 156 to track rotation of the motor 150. The control system 44 is programmed with the expected or theoretical correlation between the rotational position of the motor 150 and the reaction force RF to thereby infer braking force F.

Certain factors, however, may cause the rotational position of the motor 150 to deviate from the expected braking force F at the rotor 38. This can include, for example, tolerances in the gear train 158, force sensing assembly 110, etc. and/or deviations in motor 150 performance/tolerance from the expected construction. With this in mind, the control system 44 can adjust, e.g., increase, the current delivered to the motor 150 until the sensed reaction force RF reaches an amount equivalent to a desired braking force F at the rotor 38. Since each wheel 36, 38 has an associated caliper assembly 60 and force sensing assembly 110, the control system 44 can precisely and independently control the braking force F at each rotor 38 by monitoring the respective motor 150 rotational position and reaction force RF at the respective force sending device 110. This precise control enables the control system 44 to account for variations in and between the caliper assemblies 60, force sensing assemblies 110, brake pads, etc.

When braking is reduced or terminated, the control system 44 rotates the motor 150 in the direction $R_2$ (FIG. 3A) to retract the ball nut 100 from the rotor. The force sensing assembly 110 is configured such that the reaction force RF during braking operations is smaller than or equal to the capacity of the force sensor 180 under all reasonably expected operating conditions.

The force sensing assembly of the present invention is advantageous in that it enables the control system to correct the motor current applied to any/all of the caliper assemblies to help ensure the braking force is both correct in terms of desired degree and distribution amongst the wheels. The force sensing assembly also allows the control system to adapt over time to changes in component interrelation, wear, motor deterioration or reduction in performance, etc. When a button-type force sensor is employed, the assembly can provide higher measurement accuracy while reducing both cost and packaging compared to other force sensor configurations.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An assembly for an electromechanical brake of a vehicle having a caliper assembly driven by a motor, comprising:

a cup gear for receiving torque from the motor and transferring the torque to a spindle;

a piston coupled to the spindle and moving axially relative to the spindle in response to rotation of the spindle to brake the vehicle during a braking operation;

a force sensor aligned with the spindle and cup gear for sensing a reaction force applied to the piston during the braking operation; and a thrust bearing for transferring the reaction force from the cup gear to the force sensor.

2. The assembly of claim 1, further comprising:

a housing for receiving the cup gear and at least a portion of the spindle and the piston; and a load flange received by the cup gear and positioned axially between the spindle and the force sensor for transferring reaction force from the cup gear to the force sensor.

3. The assembly of claim 2, wherein the load flange abuts the force sensor and is spaced axially from the spindle.

4. The assembly of claim 2, wherein the force sensor includes a base pinned between the housing and the load flange and a projection extending from the base through an opening in the housing.

5. The assembly of claim 2, wherein the housing includes a laterally extending opening for receiving structure for transferring torque between the motor and the cup gear.

6. The assembly of claim 2, wherein the thrust bearing supports the load flange in the cup gear and the cup gear and the spindle are rotateable relative to the load flange.

7. The assembly of claim 1, further comprising a controller connected to the force sensor and configured to adjust the torque applied to the spindle in response to receiving signals from the force sensor indicative of the reaction force.

8. The assembly of claim 7, wherein the force sensor includes one of contact springs and contact pads for connecting the force sensor to the controller.

9. The assembly of claim 1, wherein the piston transfers the reaction force to the spindle, the spindle transfers the reaction force to the cup gear, and the cup gear transfers the reaction force to the thrust bearing.

10. The assembly of claim 9, wherein the thrust bearing transfers the reaction force to a load flange in the cup gear and the load flange transfers the reaction force to the force sensor, the cup gear being rotatable relative to the load flange.

11. The assembly of claim 1, wherein the cup gear has an anti-rotation connection with the spindle, the anti-rotation connection preventing relative rotation between the cup gear and the spindle.

12. The assembly of claim 1, wherein the piston comprises one of a ball nut and a ball ramp.

13. The assembly of claim 1, wherein the force sensor comprises a button force sensor.

14. An assembly for an electromechanical brake of a vehicle having a caliper assembly driven by a motor, comprising:

a spindle;

a piston coupled to the spindle and moving axially relative to the spindle in response to rotation of the spindle to brake the vehicle during a braking operation;

a cup gear for receiving torque from the motor and transferring the torque to the spindle;

a housing for receiving the cup gear and at least a portion of the spindle and the piston;

a button force sensor aligned with the spindle and cup gear for sensing a reaction force applied to the piston during the braking operation;

a thrust bearing for transferring the reaction force from the cup gear to the force sensor;

a load flange received by the cup gear and positioned axially between the spindle and the force sensor for transferring reaction force from the cup gear to the force sensor; and a controller connected to the button force sensor and configured to adjust the torque applied to the spindle in response to receiving signals from the force sensor indicative of the reaction force.

15. The assembly of claim 14, wherein the load flange abuts the force sensor and is spaced axially from the spindle.

16. The assembly of claim 14, wherein the force sensor includes a base pinned between the housing and the load flange and a projection extending from the base through an opening in the housing.

17. The assembly of claim 14, wherein the housing includes a laterally extending opening for receiving structure for transferring torque between the motor and the cup gear.

18. The assembly of claim 14, wherein the cup gear has an anti-rotation connection with the spindle, the anti-rotation connection preventing relative rotation between the cup gear and the spindle.

19. The assembly of claim 14, wherein the piston comprises one of a ball nut and a ball ramp.

20. The assembly of claim 14, wherein the force sensor includes one of contact springs and contact pads for connecting the force sensor to the controller.

21. The assembly of claim 14, wherein the piston transfers the reaction force to the spindle, the spindle transfers the reaction force from the piston to the cup gear, the cup gear transfers the reaction force from the spindle to the thrust bearing, the thrust bearing transfers the reaction force from the cup gear to the load flange, the thrust bearing supporting the load flange in the cup gear so that the cup gear is rotatable relative to the cup gear.

* * * * *